United States Patent
Fryer et al.

(10) Patent No.: US 7,934,442 B2
(45) Date of Patent: May 3, 2011

(54) APPARATUS FOR REMOVING A STOCKINETTE

(75) Inventors: Frank D. Fryer, Lyle, MN (US); Steven J. Bartley, Austin, MN (US); Gary A. Handel, Austin, MN (US)

(73) Assignee: Hormel Foods Corporation, Austin, MN (US)

( * ) Notice: Subject to any disclaimer, the term of this patent is extended or adjusted under 35 U.S.C. 154(b) by 950 days.

(21) Appl. No.: 11/127,935

(22) Filed: May 12, 2005

(65) Prior Publication Data

US 2006/0257538 A1 Nov. 16, 2006

(51) Int. Cl.
*B26D 7/06* (2006.01)

(52) U.S. Cl. .............. 83/130; 83/425; 83/932; 414/412; 414/414

(58) Field of Classification Search ............ 83/130, 83/932, 425, 425.2; 53/381.1, 384.1, 381.4, 53/381.2, 492; 414/412, 414; 428/34.8; 426/105, 135, 140, 518; 452/50
See application file for complete search history.

(56) References Cited

U.S. PATENT DOCUMENTS

| | | | |
|---|---|---|---|
| 3,266,541 A * | 8/1966 | Kluytenaar et al. | 83/72 |
| 3,889,442 A | 6/1975 | Grahn et al. | |
| 3,922,778 A * | 12/1975 | Aalpoel | 30/2 |
| 4,158,417 A | 6/1979 | Inoue | |
| 4,604,847 A * | 8/1986 | Moulding et al. | 53/75 |
| 4,773,203 A | 9/1988 | Yamaguchi | |
| 4,946,339 A * | 8/1990 | Berg et al. | 414/811 |
| 5,147,671 A | 9/1992 | Winkler | |
| 5,318,399 A * | 6/1994 | Marom | 414/412 |
| 5,419,095 A * | 5/1995 | Yohe | 53/384.1 |
| 5,855,231 A | 1/1999 | Mintz | |
| 6,059,647 A | 5/2000 | Imaura | |
| 6,582,290 B2 | 6/2003 | Hihnala et al. | |
| 6,656,031 B1 | 12/2003 | Andersson | |
| 6,725,631 B2 * | 4/2004 | Skrak et al. | 53/492 |
| 2003/0148051 A1 | 8/2003 | Revill | |

* cited by examiner

*Primary Examiner* — Boyer D Ashley
*Assistant Examiner* — Omar Flores-Sánchez
(74) *Attorney, Agent, or Firm* — IPLM Group, P.A.

(57) ABSTRACT

One aspect of the invention includes an automated method of removing a stockinette from meat having an end, sides, and a length. The stockinette enveloped meat is conveyed in a first direction as the stockinette is cut proximate the end of the meat with a first knife. The stockinette enveloped meat is then conveyed in a second direction as the stockinette is cut proximate the sides of the meat with a second knife and a third knife. The cuts made by the second knife and the third knife intersect with the cut made by the first knife. The cuts in the stockinette create a flap in the stockinette between the cuts. The flap is engaged and peeled away from the meat, and the meat is removed from the stockinette.

19 Claims, 8 Drawing Sheets

APPARATUS FOR REMOVING A STOCKINETTE

FIELD OF THE INVENTION

The present invention relates to a method and an apparatus for removing a stockinette.

BACKGROUND OF THE INVENTION

Many types of meat, for example ham, are processed utilizing a stockinette. A stockinette is preferably a tube of material sewn or clipped closed at one end and open at the other end. Preferably, the stockinette is a netting material made of a thin, cotton material. With ham, three to four muscles may be stuffed into the stockinette through the open end, the stockinette is squeezed tight around the muscles, and the open end is clipped to secure the stockinette about the muscles. The hams may vary in size and in shape. A relatively small amount of the muscles may ease through the openings in the stockinette. The muscles are squeezed, cooked, and smoked as is well known in the art.

After the ham is cured and set, the stockinette is removed from the ham, which is very labor intensive. A U-shaped cut is made manually with a utility knife on the top of the stockinette. The flap portion of the stockinette created by the U-shaped cut is then engaged and peeled back away from the ham. The ham is turned over, the clipped end of the stockinette is grabbed, and the ham is pushed out of the stockinette. The ham is then manually placed on a conveyor for further processing. It is important to not damage the ham by cutting the meat or by pulling some of the meat off with the stockinette. It is also important that the top of the ham be relatively free of marks or flaws. Because this is so labor intensive, it is desired to automate the process for removing a stockinette from meat such as ham.

SUMMARY OF THE INVENTION

In one aspect of the invention, an automated stockinette remover for removing a stockinette from meat having an end, sides, and a length includes a conveyor, a first knife, a passageway, a transfer member, a second knife, a third knife, and an engaging member. The conveyor has a conveying member configured and arranged to support and transport the meat in a first direction. The first knife is proximate the conveying member and is positioned for making a first cut in the stockinette proximate the end of the meat parallel to the first direction as the meat is transported in the first direction. The first cut extends perpendicular to the sides and the length of the meat. The passageway is proximate the conveying member and extends outward from the conveying member in a second direction approximately perpendicular to the first direction. The transfer member transports the meat from the conveying member in the second direction into and through the passageway. The second knife and the third knife are positioned proximate the passageway and are positioned for concurrently making a second cut and a third cut in the stockinette proximate the sides of the meat as the meat is transported through the passageway. The second cut and the third cut intersect the first cut and extend along the length of the meat. The engaging member is proximate the passageway and is configured and arranged to engage the stockinette between the cuts in the stockinette to remove the stockinette from the meat.

In another aspect of the invention, an automated stockinette remover for removing a stockinette from meat having an end, sides, and a length includes a conveyor, a first knife, a transfer member, a second knife, a third knife, and an engaging member. The conveyor is configured and arranged to transport the meat in a first direction. The first knife is proximate the conveyor and is positioned for making a first cut in the stockinette proximate the end of the meat. The first cut is parallel to the first direction and perpendicular to the sides and the length of the meat. The transfer member transports the meat in a second direction into and through a passageway, and the second direction is approximately perpendicular to the first direction. The second knife and the third knife are positioned proximate the passageway and are positioned for concurrently making a second cut and a third cut in the stockinette proximate the sides of the meat as the meat is transported through the passageway. The second cut and the third cut intersect the first cut and extend along the length of the meat. The engaging member is proximate the passageway and is configured and arranged to engage the stockinette between the cuts in the stockinette and to remove the stockinette from the meat.

In another aspect of the invention, an automated method of removing a stockinette from meat having an end, sides, and a length includes conveying a stockinette enveloped meat in a first direction and cutting the stockinette proximate the end of the meat with a first knife as the stockinette enveloped meat is being conveyed in the first direction. The stockinette enveloped meat is then conveyed in a second direction and the stockinette is cut proximate the sides of the meat with a second knife and a third knife as the stockinette enveloped meat is being conveyed in the second direction. The cuts made by the second knife and the third knife intersect with the cut made by the first knife, and the cuts in the stockinette create a flap in the stockinette between the cuts. The flap in the stockinette is engaged and peeled away from the meat. The meat is removed from the stockinette as the flap is peeled away from the meat.

In another aspect of the invention, an automated method of removing a stockinette having an end from meat having a bottom, sides, and a length includes placing the meat in the stockinette on a conveyor having an positioning plate. The bottom of the meat is placed facing upward with the length of the meat being perpendicular to the positioning plate and the end of the stockinette proximate the positioning plate. A first cut is made in the stockinette proximate the bottom of the meat approximately 1.50 inches from the positioning plate and parallel to the positioning plate with a first knife as the meat is being conveyed. The meat is moved through a passageway and a second cut and a third cut are concurrently made in the stockinette proximate the bottom of the meat as the meat is moved through the passageway. The second cut is proximate one side of the meat and the third cut is proximate another side of the meat. The second cut and the third cut are parallel to one another and intersect the first cut. The first cut, the second cut, and the third cut create a flap in the stockinette. The flap in the stockinette is contacted with an engaging member, the flap is peeled away from the end of the stockinette, and the stockinette is removed from the meat.

DETAILED DESCRIPTION OF A PREFERRED EMBODIMENT

The present invention relates to a method and an apparatus for removing a stockinette. The present invention is described with regard to removing a stockinette from a ham, but it is recognized that the present invention may be used with other types of meat or food products processed in a stockinette. An automated stockinette remover constructed according to the principles of the present invention is designated by the numeral 100.

Figure 8:
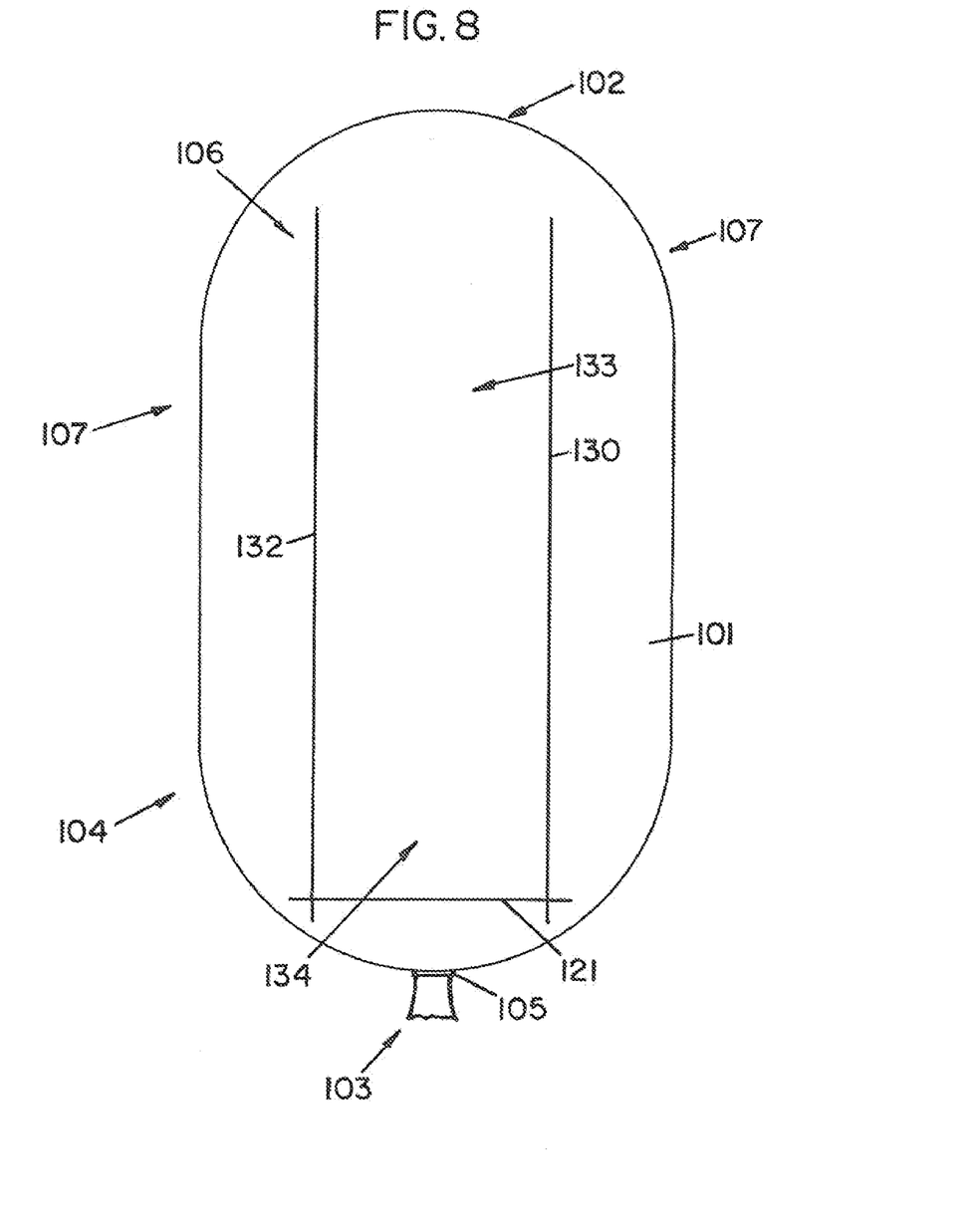
FIG. 8 is a bottom view of a ham.

As shown in FIG. 8, a stockinette 101 is secured about a ham 104. The bottom 106, which is the flat side, of the ham 104 is shown. The stockinette 101 is preferably a tube of material sewn or clipped closed at a sewn end 102 and open at an open end 103. Preferably, the stockinette 101 is made of a thin, cotton netting material. The ham 104 muscle(s) are stuffed into the stockinette 101 through the open end 103, the stockinette 101 is squeezed tight around the muscle(s), and the open end 103 is fastened with a clip 105 to secure the stockinette about the muscle(s). The ham 104 may vary in size and in shape. The muscle(s) are squeezed, cooked, and smoked as is well known in the art.

Figure 1:
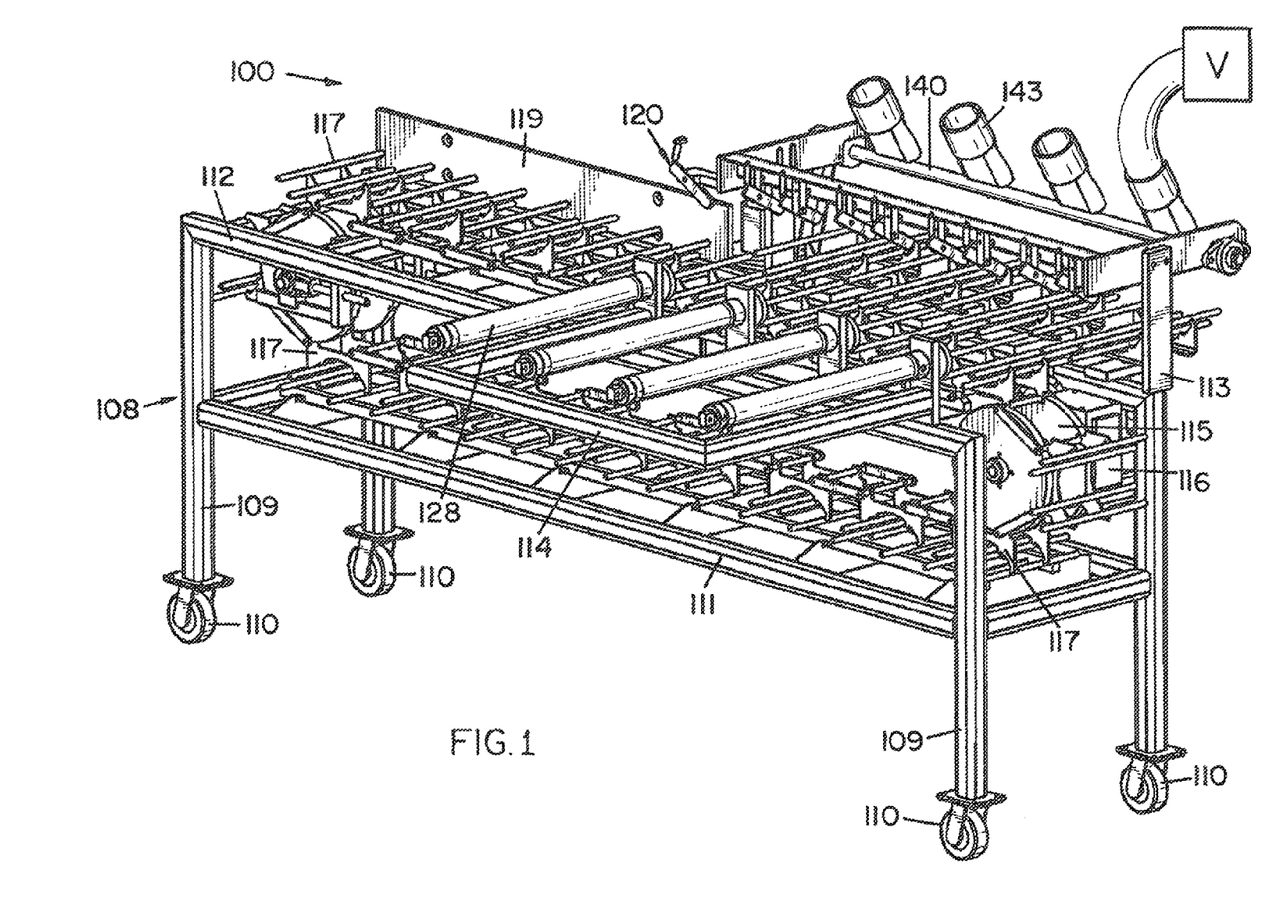
FIG. 1 is a front perspective view of a stockinette remover constructed according to the principles of the present invention.
Figure 5:
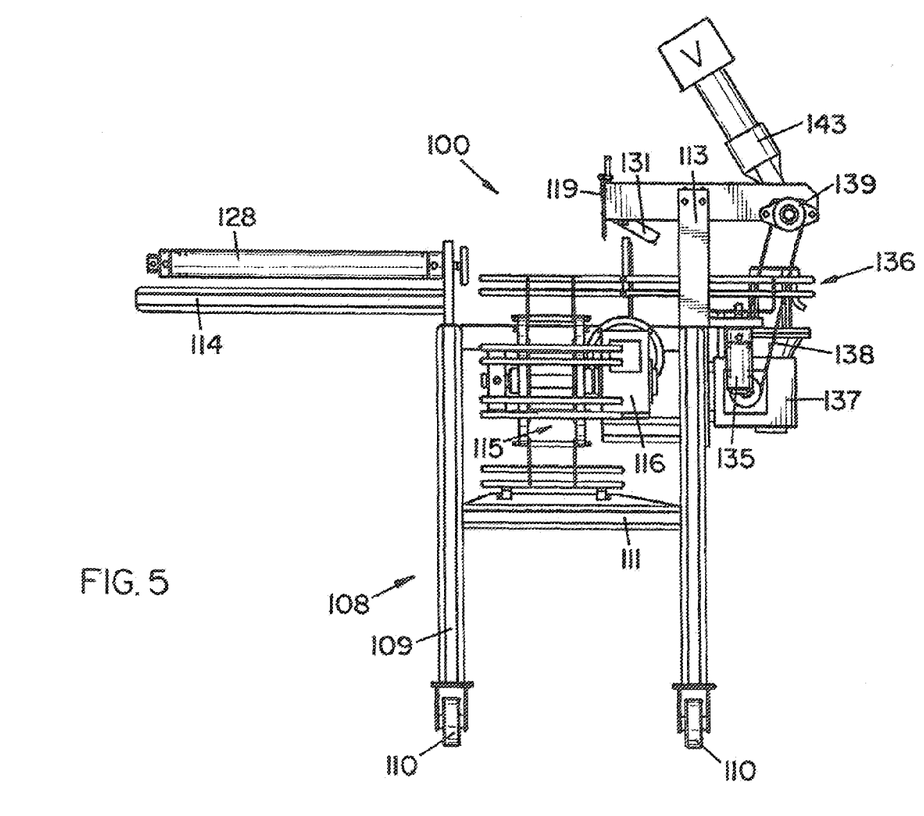
FIG. 5 is a side view of the stockinette remover shown in FIG. 1.

In one aspect of the invention, the stockinette remover 100 includes a frame 108 with four legs 109 and optional wheels 110 on the legs 109 as shown in FIG. 1. The four legs 109 preferably provide the four corners of a rectangular base for the frame 108. A first horizontal support 111 interconnects the adjacent legs 109 proximate a middle portion of the legs 109, and a second horizontal support 112 interconnects the two front legs 109 and the two rear legs 109 proximate a top portion of the legs 109. An extension support 113 extends in an upward direction proximate the rear, right quadrant of the frame 108. A third horizontal support 114 extends outward from the frame 108 proximate the front, right quadrant of the frame 108, as shown in FIG. 5.

Figure 2:
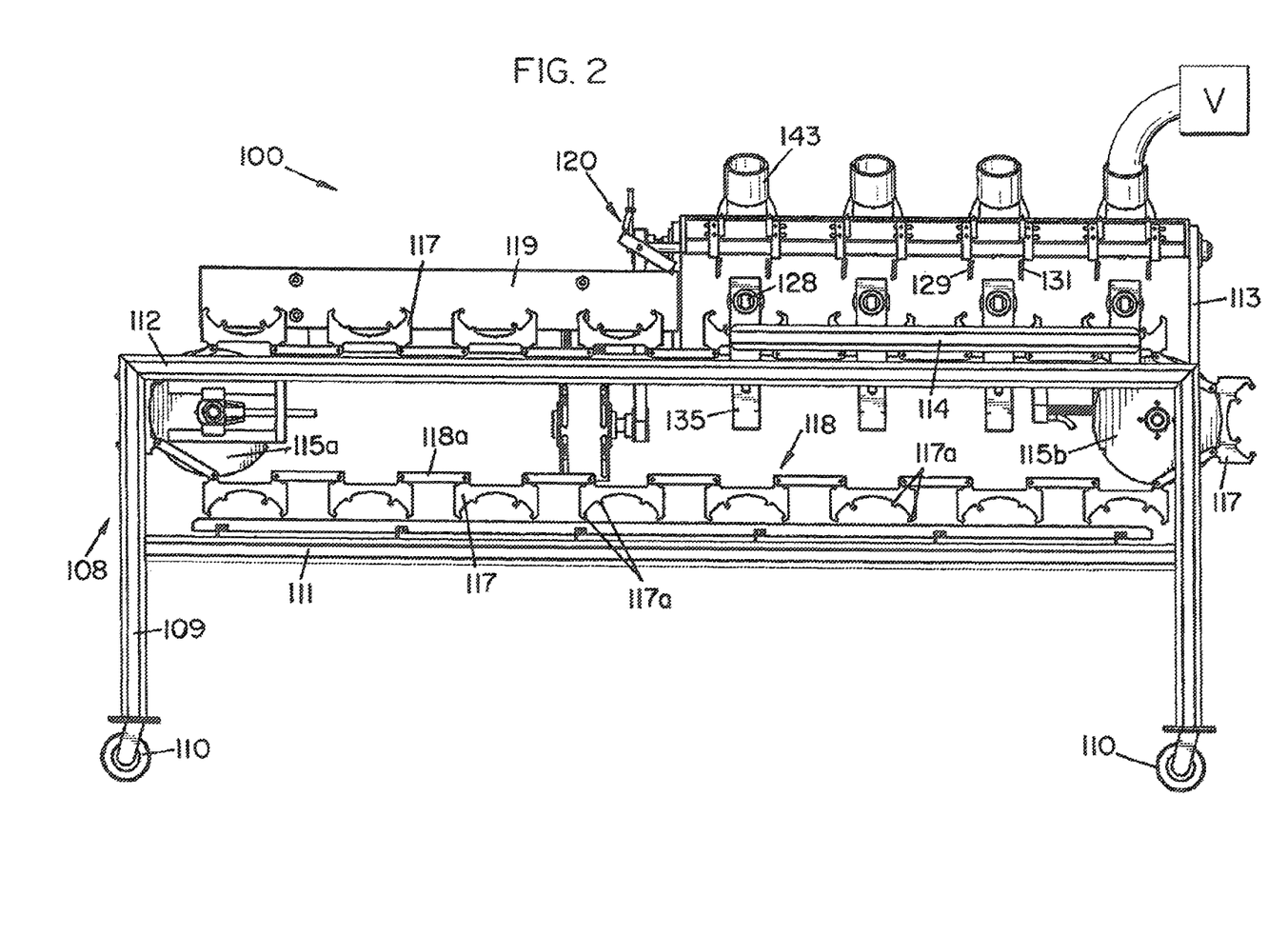
FIG. 2 is a front view of the stockinette remover shown in FIG. 1.

As shown in FIG. 2, a conveyor 115 including a conveying member 118 is supported between the first horizontal support 111 and the second horizontal support 112 and between the front and rear legs 109. The conveyor 115 includes a first wheel 115a proximate one end of the conveyor 115 and a second wheel 115b proximate the other end of the conveyor 115 about which the conveying member 118 rotates. A gear box 116 is preferably mounted to the frame 108 proximate the rear right leg 109 to drive the conveyor 115 which drives the conveying member 118 as is well known in the art.

The conveying member 118 is preferably formed by a plurality of carriages 117 interconnected by a plurality of linking members 118a, with the carriages 117 and the linking members 118a alternating. The conveying member 118 preferably does not include a single belt member rotating about the wheels 115a and 115b. Thus, there are two separate components, the alternating carriages 117 and linking members 118a, forming the conveying member 118. The linking members 118a and the carriages 117 are preferably interconnected with fasteners such as pins with snap rings which allow the conveying member 118 to be flexible as it rotates about the conveyor 115. The plurality of carriages 117 are configured and arranged to cradle a ham 104. Preferably, the ends of the carriages 117 are U-shaped plates, and each carriage 117 includes a pair of rods 117a on each side of the U-shaped plates on which the hams 104 are placed.

A positioning plate 119 is preferably mounted to the rear second horizontal support 112 proximate the rear left quadrant and extends in an upward direction therefrom. The positioning plate 119 is preferably used as a guide to properly position the end of the ham. A first knife 120 is pivotally fastened to an arm 113a extending horizontally outward from the extension support 113 proximate the positioning plate 119 with a fastener 120a such as a bolt. The first knife 120 is preferably spring loaded with a biasing member 122 interconnecting an end of the first knife 120 opposite the blade 120b to a rod 113b extending upward from the arm 113a. The biasing member 122 biases the first knife 120 so that the blade 120b points in a downward direction to cut the stockinette 101. The first knife 120 is pivotable and spring biased so that the stockinette 101 is cut regardless of the size and the shape of the ham 104 as the ham 104 is conveyed past the first knife 120. The force of the biasing member 122 is preferably set to ensure that the first knife 120 is allowed to follow the contour of the ham 104, regardless of the size and the shape of the ham 104. The dept of the cut is determined by how far the blade 120b extends outward from the first knife 120.

Figure 3:
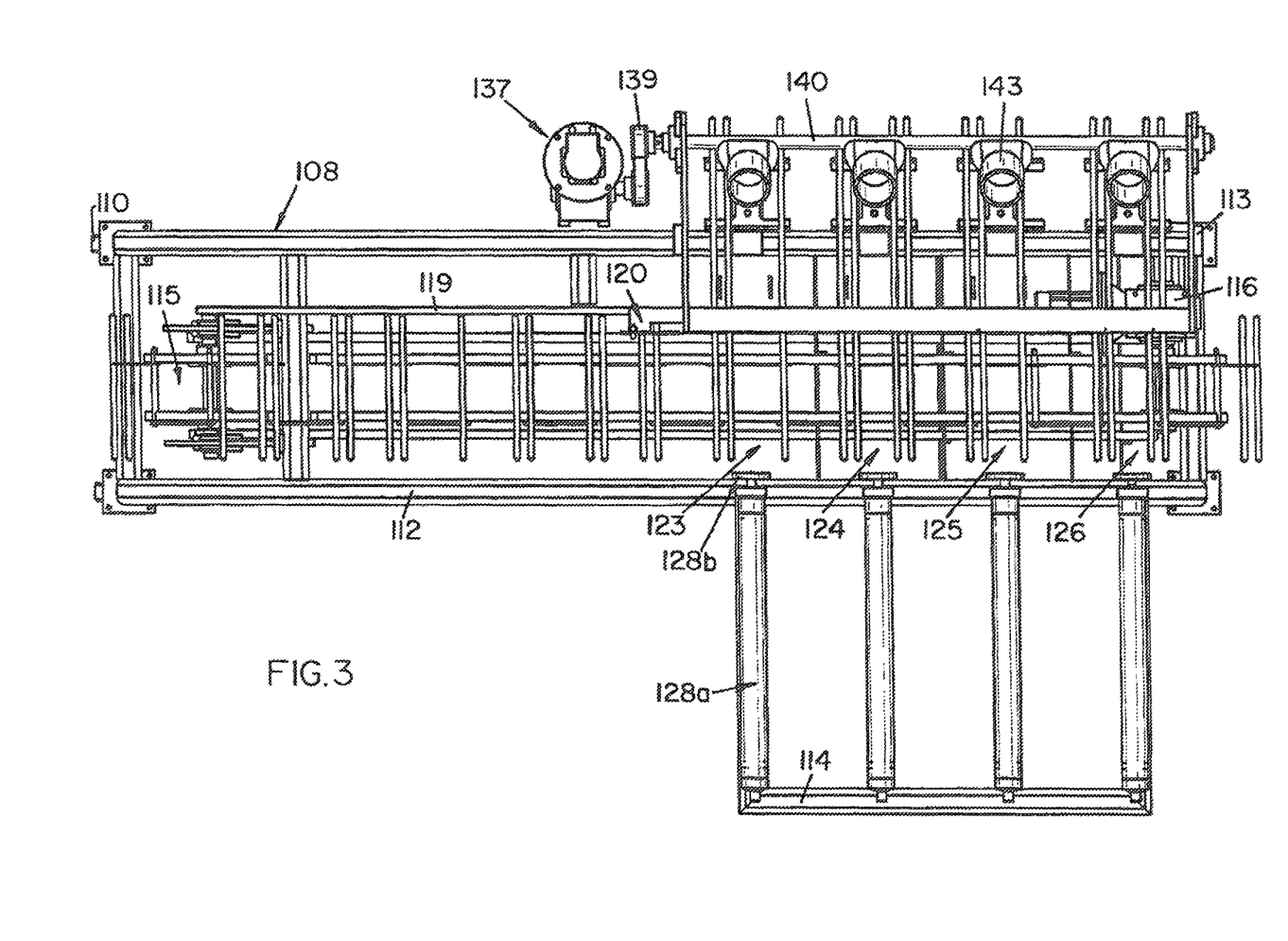
FIG. 3 is a top view of the stockinette remover shown in FIG. 1.

As shown in FIG. 3, a first passageway 123, a second passageway 124, a third passageway 125, and a fourth passageway 126 are located along the extension support 113 proximate the conveyor 115 and the rear of the frame 108. Four passageways are shown and described, but it is recognized that any number of passageways, including one passageway, could be used. The first passageway 123 is preferably located proximate the end of the extension support 113 and the positioning plate 119 and the remaining passageways are located sequentially thereafter with the fourth passageway 126 preferably located proximate the end of the extension support 113 and the right side of the frame 108. The passageways are configured and arranged to be alignable with four adjacent carriages 117 on the conveyor 115.

A transfer member 128 preferably includes a piston rod 128b actuated by an air cylinder 128a, and a transfer member 128 corresponds with each of the four passageways. The transfer members 128 are connected to the frame 108 by suitable means well known in the art such as the third horizontal support 114. Each piston rod 128b is preferably actuated by an air cylinder 128a, and the air cylinder 128a causes the piston rod 128b to extend horizontally toward and through a central portion of the respective passageway.

Figure 7:
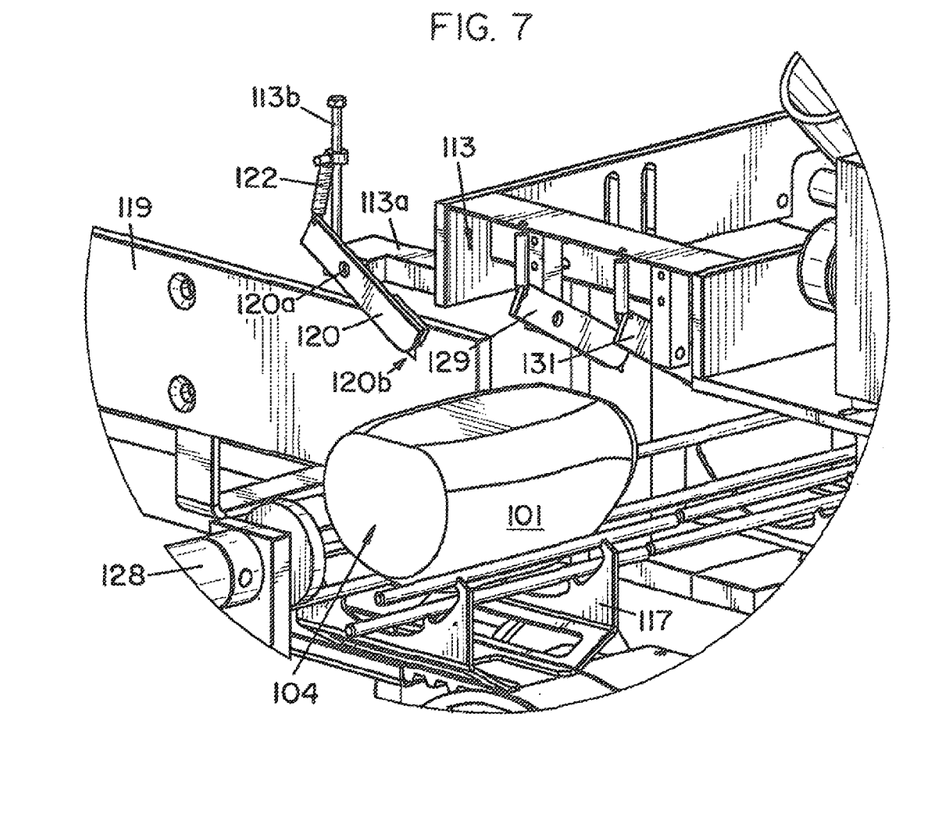
FIG. 7 is a front perspective view of a cutting assembly of the stockinette remover shown in FIG. 1.

Positioned proximate each passageway is a second knife 129 and a third knife 131 pivotally fastened and spring biased with a biasing member, similar to the first knife 120 and as is well known in the art, to the extension support 113 proximate each carriage 117 and the entrance of the respective passageway as shown in FIG. 7. The second and third knives 129 and 131 are preferably approximately aligned with the positioning plate 119 and the respective blades extend in a downward direction proximate a central portion of the respective passageway. The second and third knives 129 and 131 are preferably parallel and approximately 3⅛ inches apart. The biasing member biases the knives 129 and 131 so that the blades point in a downward direction to cut the stockinette 101. The knives 129 and 131 are pivotable and spring biased so that the stockinette 101 is cut regardless of the size and the shape of the ham 104 as the ham 104 is conveyed past the knives 129 and 131. The force of the biasing member of each of the knives 129 and 131 is preferably set to ensure that the knives 129 and 131 are allowed to follow the contour of the ham 104, regardless of the size and the shape of the ham 104. The dept of the cut is determined by how far the blades extend outward from the knives 129 and 131. The knives 129 and 131 make cuts perpendicular to and intersecting the cut made by the first knife 120.

A lift tray 136 is located proximate the exit of each passageway and the rear of the frame 108. The lift trays 136 are preferably configured and arranged to cradle a ham 104. Preferably, the ends of the lift trays 136 are U-shaped plates, and each lift tray 136 includes a pair of rods 136a on each side of the U-shaped plates on which the hams 104 are placed. The two pair of rods 136a of the lift tray 136 are preferably in alignment with the two pair of rods 117a of the carriage 117 in each passageway. The aligned rods allow the ham 104 to be pushed from the carriage 117 to the lift tray 136 by the transfer member 128.

A lift member 135 preferably includes a piston rod 135b actuated by an air cylinder 135a, and a lift member 135 corresponds with each lift tray 136. The lift members 135 are connected to the frame 108 by suitable means well known in the art such as being connected to the second horizontal support 112 proximate the extension support 113 with brackets or other suitable fasteners. Each piston rod 135b is preferably actuated by an air cylinder 135a, and the air cylinder 135a causes the piston rod 135b to extend vertically upward toward the respective lift tray 136 to lift the respective lift tray 136 in an upward direction.

Figure 6:
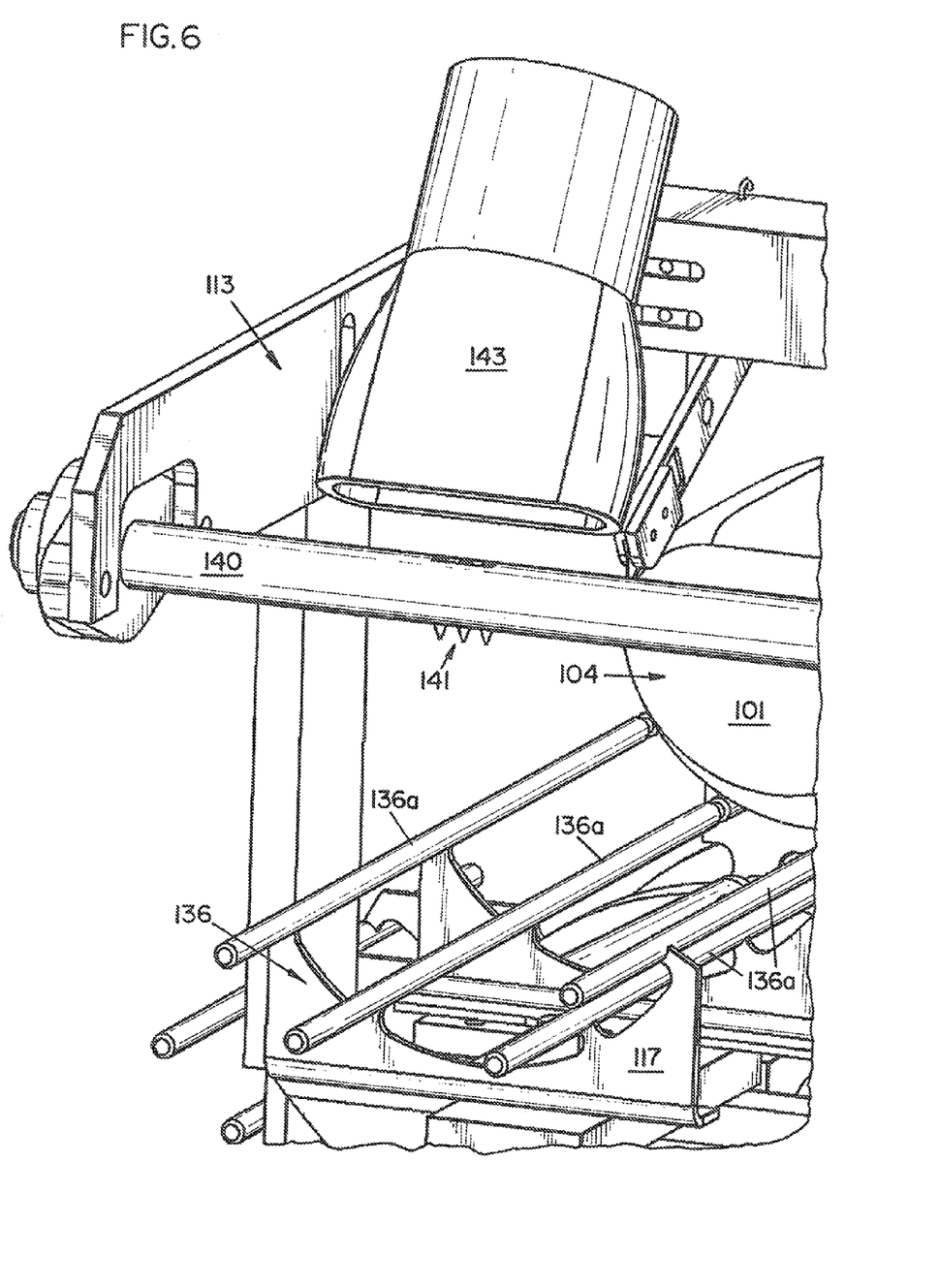
FIG. 6 is a rear perspective view of a shaft and a suction tube of the stockinette remover shown in FIG. 1.

An engaging member 140 is preferably a shaft rotatably connected to the extension support 113 above the lift trays 136 and extending across the length of the extension support 113. The engaging member 140 includes an engaging surface 141 proximate the center of each lift tray 136. Preferably, the engaging surface 141 is a row of pins along a portion of the rotatable shaft as shown in FIG. 6. The engaging surface 141 extends outward from the engaging member 140 and provides a textured surface on the engaging member 140 proximate the center of each lift tray 136. A rotating shaft, a hook member, or any other suitable engaging member having an engaging surface may be used.

Figure 4:
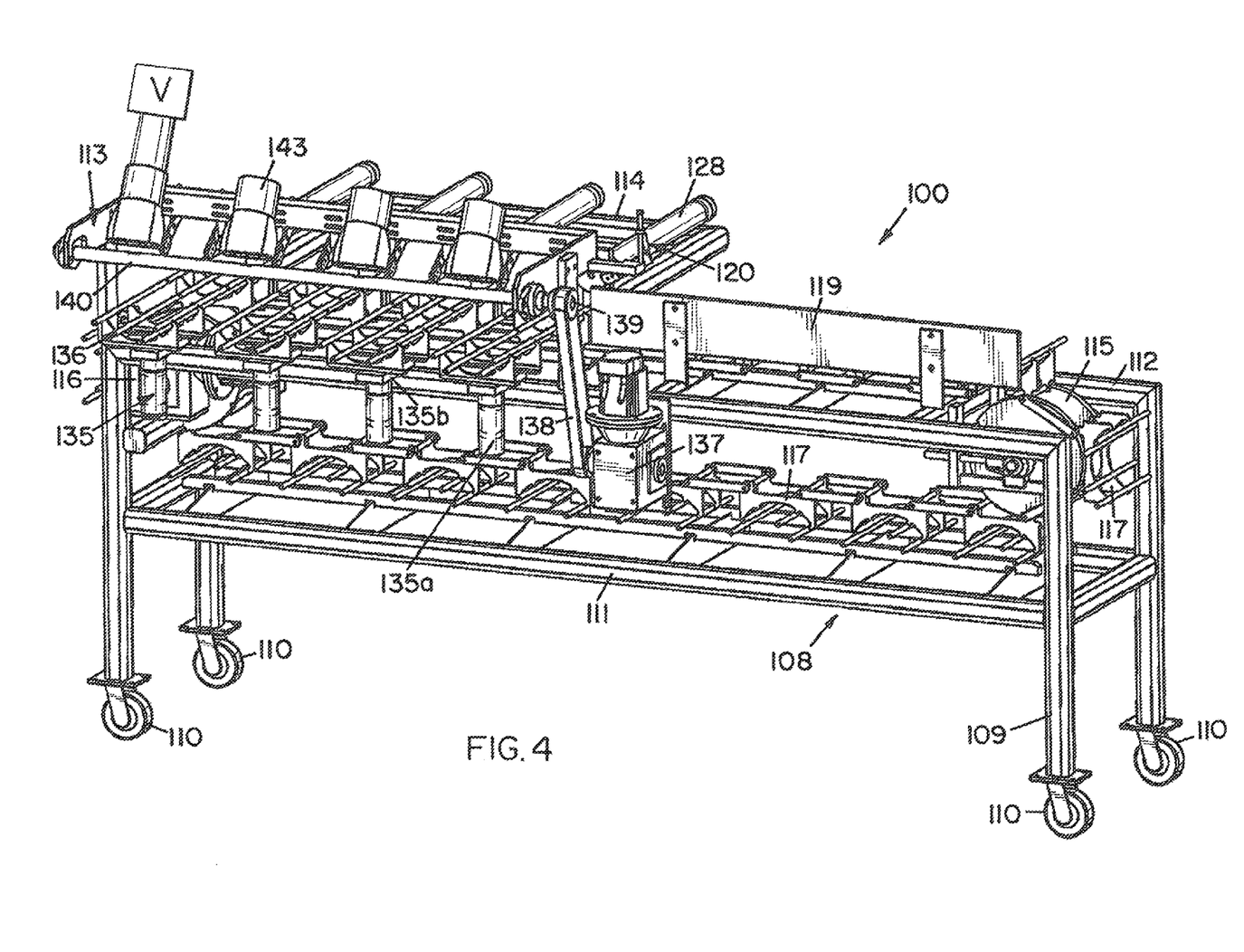
FIG. 4 is a rear perspective view of the stockinette remover shown in FIG. 1.

A motor 137, shown in FIG. 4, activates a drive belt 138 to turn a pulley 139 connected to the engaging member 140 thereby causing the engaging member 140 to rotate with the pulley 139. The motor 137 is preferably mounted to the frame 108 proximate the second horizontal support 112, the positioning plate 119, and the extension support 113 and the pulley 139 is preferably mounted to the engaging member 140 proximate the positioning plate 119 and the extension support 113. A suction tube 143 is mounted to the extension support 113 proximate the engaging member 140, and a vacuum source V is in fluid communication with the suction tube 143.

In operation, hams 104 in stockinettes 101 are manually placed on the carriages 117 connected to the conveyor 115 proximate the second horizontal support 112 of the frame 108 with the bottom 106 of the hams 104 facing in an upward direction. The bottom 106 of the hams 104 is the flat side of the hams 104. The open end 103 of the stockinette 101 of each ham 104 is placed against the positioning plate 119. The conveyor 115 advances the carriages 117 carrying the hams 104 toward a first knife 120, which is preferably a spring loaded knife well known in the art. The first knife 120 has a set distance from the positioning plate 119, preferably 1.50 inches from the open end 103 of the stockinette 101 regardless of the overall length of the ham 104. The first knife 120 makes a first cut 121 in the stockinette 101 of each ham 104 as each ham 104 is conveyed past the first knife 120. The first knife 120 is pivotable and spring biased so that the stockinette 101 is cut regardless of the size and the shape of the ham 104 as the ham 104 is conveyed past the first knife 120. The force of the biasing member 122 ensures that the first knife 120 follows the contour of the ham 104. The first cut 121 is parallel to the direction of travel of the conveyor 115, which is perpendicular to the length of the ham 104.

After the first cut 121 is made in the stockinette 101 of the first ham, the conveyor 115 continues to advance the first ham to a first passageway 123. Then a stockinette 101 of a second ham is cut, and after the first cut 121 is made in the stockinette 101 of the second ham, the conveyor 115 continues to advance the first ham to a second passageway 124 and the second ham to the first passageway 123. Then a stockinette 101 of a third ham is cut, and after the first cut 121 is made in the stockinette 101 of the third ham, the conveyor 115 continues to advance the first ham to a third passageway 125, the second ham to the second passageway 124, and the third ham to the first passageway 123. Then a stockinette 101 of a fourth ham is cut, and after the first cut 121 is made in the stockinette 101 of the fourth ham, the conveyor 115 continues to advance the first ham to a fourth passageway 126, the second ham to the third passageway 125, the third ham to the second passageway 124, and the fourth ham to the first passageway 123. Four passageways are shown and described, but it is recognized that any number of passageways could be used. Four passageways allow for greater productivity.

Each passageway includes a transfer member 128 including a piston rod 128b actuated by an air cylinder 128a as is well known in the art. The piston rod 128b pushes the respective ham 104 off of the carriage 117 and through the respective passageway thereby making the second and third cuts 130 and 132 with the second and third knives 129 and 131, respectively, in the stockinette 101. The knives 129 and 131 are pivotable and spring biased so that the stockinette 101 is cut regardless of the size and the shape of the ham 104 as the ham 104 is conveyed past the knives 129 and 131. The force of the biasing members ensure that the stockinette 101 is sufficiently cut without cutting too deeply into the ham 104. The knives 129 and 131 make cuts perpendicular to and intersecting the first cut 121 made by the first knife 120.

The second and third cuts 130 and 132 are parallel to the length of the respective ham 104 and the direction of travel through the passageway, which are perpendicular to the direction of travel on the conveyor 115 and the first cut 121. The second and third cuts 130 and 132 are preferably 3⅛ inches apart and intersect with the first cut 121. The second and third cuts 130 and 132 are also preferably proximate the sides 107 of the ham 104. The cuts 121, 130, and 132 create a flap 133 in the stockinette 101 and a snag area 134 proximate the first cut 121 between the second and third cuts 130 and 132. The cuts 121, 130, and 132 are preferably shallow on the bottom of the ham 104 so there is no readily apparent visual damage to the ham 104. Photoelectric eyes may be used to control the stroke lengths of the transfer members 128 to accommodate different sizes of hams 104.

The transfer member 128 pushes the ham 104 through the passageway and onto a lift tray 136, and the carriage 117 is subsequently conveyed away. At the start of the next cycle, the transfer member 128 stops pushing the ham 104 when the ham 104 is located under the engaging member 140. The engaging member 140 includes engaging surface 141 protruding outward from the engaging member 140 proximate the snag area 134 of the stockinette 101. A photoelectric sensor may be used to determine when the ham 104 is located under the engaging member 140.

A lift member 135 including a piston rod 135b actuated by an air cylinder 135a as is well known in the art is used to lift the lift tray 136 carrying the ham 104 in an upward direction to get a positive connection between the engaging member 140 and the stockinette 101 covered ham 104 before the engaging member 140 begins to rotate. The lift tray 136 is preferably held in an upward position for approximately 1 to 2 rotations of the engaging member 140 and then it is lowered. The lift tray 136 is preferably only lifted long enough for the stockinette 101 to be wrapped around the engaging member 140 and then it is lowered. The ham 104 is preferably held in substantially constant contact with the engaging member 140 preventing the stockinette 101 from pulling tightly about the ham 104 and damaging the ham 104 during removal of the stockinette 101 from the ham 104. After the stockinette 101 has become wrapped around the engaging member 140 and the lift tray 136 has been lowered, it is the wrapping action that maintains the contact with the engaging member 140. The contact with the engaging member 140 prevents pulling of the stockinette 101 and tightening of the stockinette 101 about the ham 104. If the stockinette 101 were pulled too tightly, the stockinette 101 would squeeze the ham 104 and potentially damage the ham 104 or prevent removal of the stockinette 101 from the ham 104. The contact with the engaging member 140 assists in preventing the stockinette 101 from being pulled too tightly about the ham 104. The engaging surface 141 is preferably a row of pins located on a portion of the shaft rather than around the circumference of the shaft. Preferably after one revolution of the engaging member 140 the stockinette 101 covers the engaging surface 141 so there is no damage to the ham 104.

The engaging surface 141 on the engaging member 140 is designed to snag the stockinette 101 proximate the snag area 134. The piston rod 135b lifts the ham 104 to contact the engaging member 140 and the engaging member 140 contacts the bottom 106 of the ham 104. As the engaging member 140 rotates, the pins on the shaft snag the snag area 134 of the stockinette 101 and the flap 133 of the stockinette 101 is wrapped about the engaging member 140 thereby separating the flap 133 from the ham 104. The engaging surface 141 simply snags the snag area 134 of the stockinette 101 initially and then the rotating engaging member 140 contacting the ham 104 removes the stockinette 101 from the ham 104.

At the end of the flap 133 of the stockinette 101, the engaging member 140 continues to rotate and the stockinette 101 proximate the sewn end 102 is wrapped about the engaging member 140 which turns the ham 104 on end and releases the ham 104 from the stockinette 101. By rotating the engaging member 140, the stockinette 101 is peeled from the ham 104 without damage to the ham 104. As the stockinette 101 is peeled from the ham 104, the ham 104 is not controlled so the ham 104 may move in any direction. While the stockinette 101 is being removed from the engaging member 140, the next ham 104 to be processed is indexed into position. After the stockinette 101 has been removed from the ham 104, the ham 104 falls bottom 106 down on the take-away conveyor (not shown) and the stockinette 101 remains on the engaging member 140. Different sizes of lift trays 136 could be used to accommodate different size hams.

The engaging member 140 is then rotated in the reverse direction to unwind the stockinette 101 from the engaging member 140. A vacuum source V assists in the removal of the stockinette 101 from the engaging member 140. The vacuum source V is turned on, the direction of rotation of the engaging member 140 is reversed, and the stockinette 101 is removed from the engaging member 140 through the suction tube 143 as the stockinette 101 is unwound from the engaging member 140. The stockinette 101 is then discarded.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An automated stockinette remover for removing a stockinette from meat, the meat having an end, sides, and a length, comprising:
   a) a conveyor having a conveying member configured and arranged to support and transport the meat in a first direction;
   b) a first knife proximate the conveying member, the first knife being positioned for making a first cut in the stockinette proximate the end of the meat parallel to the first direction as the meat is transported in the first direction, the first cut extending perpendicular to the sides and the length of the meat;
   c) a passageway proximate the conveying member, the passageway extending outward from the conveying member in a second direction approximately perpendicular to the first direction;
   d) a transfer member to transport the meat from the conveying member in the second direction into and through the passageway;
   e) a second knife and a third knife positioned proximate the passageway, the second knife and the third knife positioned for concurrently making a second cut and a third cut in the stockinette proximate the sides of the meat as the meat is transported through the passageway, the second cut and the third cut intersecting the first cut and extending along the length of the meat; and
   f) an engaging member proximate the passageway configured and arranged to engage the stockinette between the cuts in the stockinette to remove the stockinette from the meat.

2. The automated stockinette remover of claim 1, further comprising a plurality of carriages operatively connected to the conveying member of the conveyor configured and arranged to support the meat.

3. The automated stockinette remover of claim 1, further comprising an indexing member parallel to the first direction proximate the conveying member, the first cut being a predetermined distance from the indexing member.

4. The automated stockinette remover of claim 1, wherein the first knife, the second knife, and the third knife are spring loaded.

5. The automated stockinette remover of claim 1, wherein the transfer member is a piston rod actuated by an air cylinder.

6. The automated stockinette remover of claim 1, further comprising an engaging surface on the engaging member, the engaging surface contacting the stockinette and the meat during removal of the stockinette from the meat.

7. The automated stockinette remover of claim 6, wherein the engaging member is a rotatable shaft and the engaging surface is a row of pins on the rotatable shaft, the row of pins snagging the stockinette and the stockinette winding about the shaft to peel the stockinette away from the meat as the shaft is rotated thereby removing the stockinette from the meat.

8. The automated stockinette remover of claim 7, further comprising a vacuum source to remove the stockinette from the rotatable shaft.

9. The automated stockinette remover of claim 1, wherein the engaging member is rotatable in a first direction to wind a portion of the stockinette about the engaging member to remove the stockinette from the meat, and wherein the engaging member is rotatable in a second direction to unwind the portion of the stockinette from the engaging member to remove the stockinette from the engaging member.

10. The automated stockinette remover of claim 9, wherein the engaging member contacts the meat to prevent the stockinette from pulling about the meat and damaging the meat during removal of the stockinette.

11. An automated stockinette remover for removing a stockinette from meat, the meat having an end, sides, and a length, comprising:
   a) a conveyor configured and arranged to transport the meat in a first direction;
   b) a first knife proximate the conveyor positioned for making a first cut in the stockinette proximate the end of the meat, the first cut being parallel to the first direction and perpendicular to the sides and the length of the meat;
   c) a transfer member to transport the meat in a second direction into and through a passageway, the second direction being approximately perpendicular to the first direction;
   d) a second knife and a third knife positioned proximate the passageway, the second knife and the third knife positioned for concurrently making a second cut and a third cut in the stockinette proximate the sides of the meat as the meat is transported through the passageway, the second cut and the third cut intersecting the first cut and extending along the length of the meat; and
   e) an engaging member proximate the passageway configured and arranged to engage the stockinette between the cuts in the stockinette and to remove the stockinette from the meat.

12. The automated stockinette remover of claim 11, further comprising an indexing member parallel to the first direction proximate the conveyor, the indexing member ensuring the first cut is made a predetermined distance from the end of the meat.

13. The automated stockinette remover of claim 11, further comprising a vacuum source to remove the stockinette from the engaging member.

14. The automated stockinette remover of claim 11, further comprising an engaging surface on the engaging member, the engaging surface snagging the stockinette and contacting the meat during removal of the stockinette from the meat.

15. The automated stockinette remover of claim 14, wherein the engaging member is a rotatable shaft and the engaging surface is a row of pins on the rotatable shaft, the row of pins snagging the stockinette and the stockinette winding about the shaft to peel the stockinette away from the meat as the shaft is rotated thereby removing the stockinette from the meat.

16. The automated stockinette remover of claim 11, wherein the first knife, the second knife, and the third knife are spring loaded.

17. The automated stockinette remover of claim 11, wherein the transfer member is a piston rod actuated by an air cylinder.

18. The automated stockinette remover of claim 11, wherein the engaging member is rotatable in a first direction to wind a portion of the stockinette about the engaging member to remove the stockinette from the meat, and wherein the engaging member is rotatable in a second direction to unwind the portion of the stockinette from the engaging member to remove the stockinette from the engaging member.

19. The automated stockinette remover of claim 18, wherein the engaging member contacts the meat to prevent the stockinette from pulling about the meat and damaging the meat during removal of the stockinette.

\* \* \* \* \*